United States Patent
Dolenec

(10) Patent No.: US 9,057,300 B2
(45) Date of Patent: Jun. 16, 2015

(54) REDUCING AGENT METERING SYSTEM WITH METERING CHAMBER FOR EXACT SETTING OF THE METERED AMOUNT

(71) Applicant: Albonair GmbH, Dortmund (DE)

(72) Inventor: Sascha Dolenec, Holzwickede (DE)

(73) Assignee: Albonair GmbH, Dortmund (DE)

( * ) Notice: Subject to any disclaimer, the term of this patent is extended or adjusted under 35 U.S.C. 154(b) by 45 days.

(21) Appl. No.: 13/952,765

(22) Filed: Jul. 29, 2013

(65) Prior Publication Data
US 2014/0033681 A1 Feb. 6, 2014

(30) Foreign Application Priority Data
Jul. 31, 2012 (DE) .......................... 10 2012 015 046

(51) Int. Cl.
  *F01N 3/00* (2006.01)
  *F01N 3/08* (2006.01)
  *F01N 3/20* (2006.01)

(52) U.S. Cl.
  CPC F01N 3/08 (2013.01); F01N 3/208 (2013.01); F01N 2610/085 (2013.01); F01N 2610/14 (2013.01); F01N 2610/1466 (2013.01); Y02T 10/24 (2013.01)

(58) Field of Classification Search
  CPC ..... F01N 3/208; F01N 3/08; F01N 2610/085; F01N 2610/14; F01N 2610/1466; Y02T 10/24
  See application file for complete search history.

(56) References Cited

U.S. PATENT DOCUMENTS

| | | | | |
|---|---|---|---|---|
| 2,758,747 A | * | 8/1956 | Stevens | 220/530 |
| 7,874,148 B2 | * | 1/2011 | Duffield | 60/297 |
| 2009/0191074 A1 | * | 7/2009 | Suzuki | 417/423.7 |
| 2010/0062296 A1 | * | 3/2010 | Johannessen | 429/19 |
| 2010/0115932 A1 | * | 5/2010 | Kassel et al. | 60/299 |
| 2010/0313683 A1 | | 12/2010 | Nickel et al. | |
| 2011/0030334 A1 | * | 2/2011 | Garcia et al. | 60/39.094 |
| 2014/0007558 A1 | * | 1/2014 | Overhoff et al. | 60/274 |

FOREIGN PATENT DOCUMENTS

| | | | | |
|---|---|---|---|---|
| DE | 10 2009 029 188 A1 | 3/2011 | | |
| DE | 10 2010 030 050 A1 | 12/2011 | | |
| DE | 102010030050 | * 12/2011 | ............... | F01N 3/10 |
| DE | 10 2011 014 026 A1 | 9/2012 | | |
| WO | 2010 129841 A1 | 11/2010 | | |
| WO | 2012 123051 A1 | 9/2012 | | |

OTHER PUBLICATIONS

Search Report issued by European Patent Office dated Sep. 9, 2013.

* cited by examiner

*Primary Examiner* — Jesse Bogue
(74) *Attorney, Agent, or Firm* — Law Offices of Robert F. Zielinski LLC

(57) ABSTRACT

The invention relates to a reducing agent metering system for injection of a reducing agent into the exhaust gas flow of an internal combustion engine for selective catalytic reduction, with a delivery pump (2) by means of which the reducing agent is delivered from a reducing agent tank (1) via a delivery line (3) and is introduced into the exhaust gas flow of the internal combustion engine via at least one nozzle (7), a metering chamber (4) being integrated into the delivery line (3) and being divided into two separate volumes (10, 20) by means of a position-variable element (5), each of the two volumes (10, 20) having at least one input (11, 21) and at least one output (12, 22). Furthermore the invention relates to a method for operating such a reducing agent metering system for injection of a reducing agent into the exhaust gas flow of an internal combustion engine for selective catalytic reduction.

20 Claims, 1 Drawing Sheet

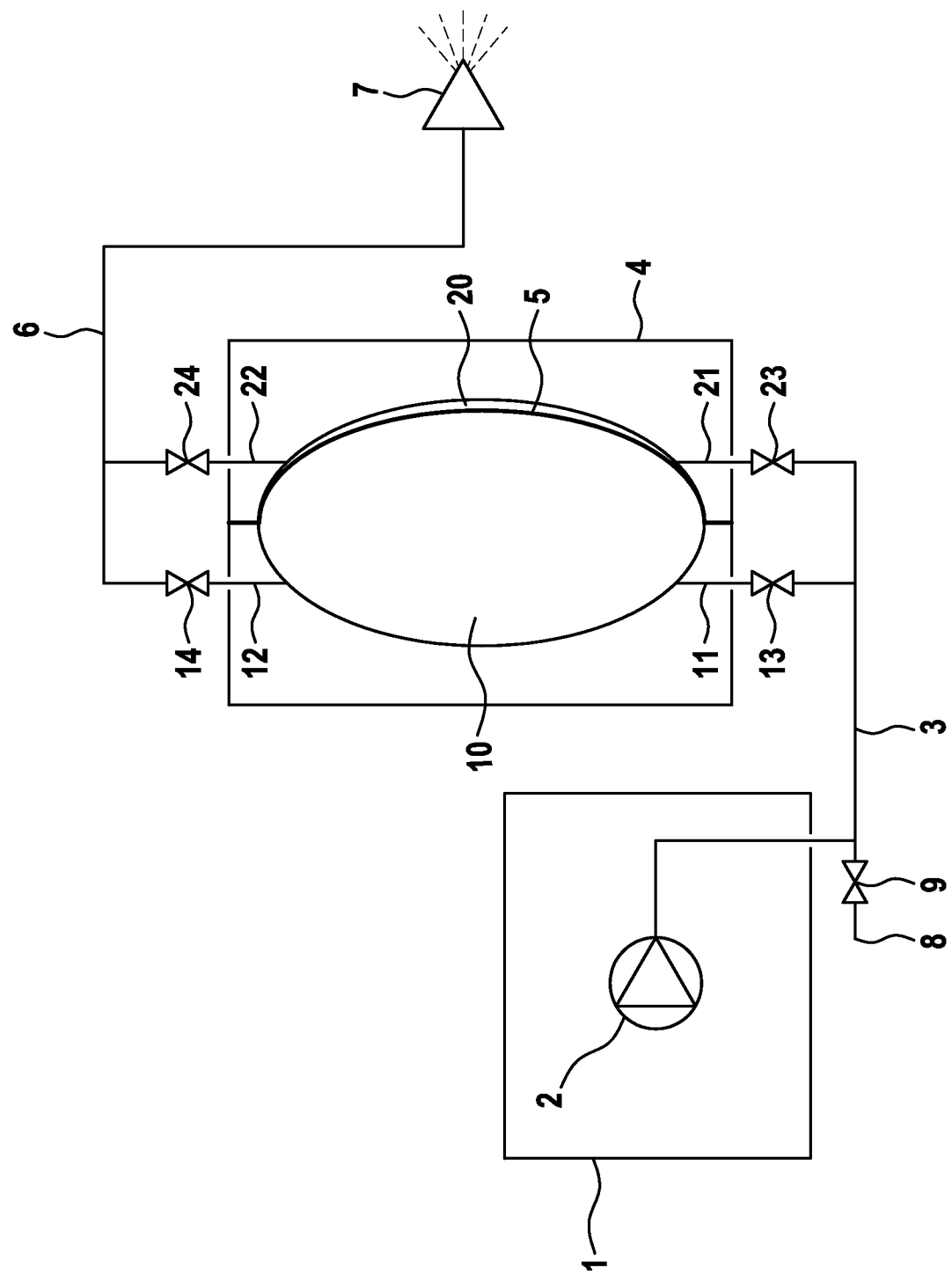

REDUCING AGENT METERING SYSTEM WITH METERING CHAMBER FOR EXACT SETTING OF THE METERED AMOUNT

The invention relates to a reducing agent metering system for injection of a reducing agent into the exhaust gas flow of an internal combustion engine for selective catalytic reduction, with a delivery pump by means of which the reducing agent is delivered from a reducing agent tank via a delivery line and is introduced into the exhaust gas flow of the internal combustion engine via at least one nozzle.

Furthermore the invention relates to a method for operating a reducing agent metering system for injection of a reducing agent into the exhaust gas flow of an internal combustion engine for selective catalytic reduction, with a delivery pump by means of which the reducing agent is delivered from a reducing agent tank via a delivery line and is introduced into the exhaust gas flow of the internal combustion engine via at least one nozzle.

Catalytic converters for selective catalytic reduction, so-called SCR-catalytic converters (SCR: selective catalytic reduction) are used to reduce the nitrogen oxide emission from diesel engines, furnace installations, garbage incineration systems, industrial plants and the like. To do this a reducing agent is injected into the exhaust gas system with a metering device. The reducing agent is ammonia or an ammonia solution or another reducing agent.

Since carrying ammonia in motor vehicles is critical with regard to safety, urea in an aqueous solution with conventionally a 32.5% urea proportion according to DIN 70070, so-called AdBlue, is used. In the exhaust gas the urea decomposes at temperatures above 150° Celsius into gaseous ammonia and $CO_2$. The parameters for the decomposition of urea are essentially time (vaporization and reaction time), temperature and droplet size of the injected urea solution. In these SCR catalytic converters the emission of nitrogen oxides is reduced by roughly 90% by selective catalytic reduction (SCR).

In the known reducing agent metering systems for injection of a reducing agent into the exhaust gas flow of an internal combustion engine for selective catalytic reduction, the reducing agent solution is delivered to the nozzle by means of a membrane pump or piston pump. The disadvantage here is that due to the delivery cycles of the pump it is impossible to keep the delivered mass flow of the reducing agent constant and to determine it exactly. Rather as a result of the pulsations of the membrane pump or piston pump discontinuous charging of the nozzle with the reducing agent occurs.

The object of the invention is to develop a reducing agent metering system of the initially named type such that it is possible to exactly fix the metering volume by cycle regardless of the composition and properties of the delivery pump being used.

Another object of the invention is to devise a method for operating a reducing agent metering system which allows the metering volume to be exactly fixed by cycle regardless of the composition and properties of the delivery pump being used.

This object is achieved as claimed in the invention by a reducing agent metering system as claimed in Claim 1 and by a method for operating a reducing agent metering system as claimed in Claim 12. Advantageous developments of the invention are given in the respective dependent claims.

In the reducing agent metering system for injection of a reducing agent into the exhaust gas flow of an internal combustion engine for selective catalytic reduction, with a delivery pump by means of which the reducing agent is delivered from a reducing agent tank via a delivery line and is introduced into the exhaust gas flow of the internal combustion engine via at least one nozzle, it is especially advantageous that a metering chamber is integrated into the delivery line and is divided into two separate volumes by means of a position-variable element, each of the two volumes having at least one input and at least one output.

In the method for operating a reducing agent metering system for injection of a reducing agent into the exhaust gas flow of an internal combustion engine for selective catalytic reduction, with a delivery pump by means of which the reducing agent is delivered from a reducing agent tank via a delivery line and is introduced into the exhaust gas flow of the internal combustion engine via at least one nozzle, it is especially advantageous that a metering chamber is integrated into the delivery line and is divided into two separate volumes by means of a position-variable element, each of the two volumes having at least one input and at least one output, during metering operation of the metering system cycles being repeatedly passed through, in which in alternation the input of the first volume simultaneously with the output of the second volume is opened, while the input of the second volume and the output of the first volume are closed and then the input of the second volume simultaneously with the output of the first volume is opened while the input of the first volume and the output of the second volume are closed.

The terms reducing agent metering system and metering system are used synonymously within the scope of this specification. The term reducing agent solution or reducing agent encompasses any reducing agent which is suitable for selective catalytic reduction, preferably a urea solution according to DIN 70070 is used for this purpose. But the invention is not limited thereto.

In one preferred overall arrangement the reducing agent metering system has a tank which is filled with the reducing agent solution and from which the reducing agent solution is taken and delivered by means of the delivery pump and is introduced into the exhaust gas flow of the internal combustion engine via at least one nozzle.

The core of the invention is thus that in the metering system on the pressure side of the delivery pump a metering chamber is integrated into the delivery line, this metering chamber being divided by means of a position-variable element into two separate volumes and each of the two volumes having at least one input and at least one output. Preferably this position-variable element is formed by a flexible membrane.

The metering system during metering of the reducing agent works such that cycles are repeatedly passed through. In these cycles first the input of the first volume is opened so that the delivery pump delivers into the first volume, at this instant the output of the first volume being closed so that the first volume in the metering chamber is filled with reducing agent as a result of delivery by the delivery pump. At the same time the input of the second volume is closed, while at the same time the output of this second volume is opened.

Because the metering chamber is divided into two separate volumes by means of the position-variable element, but the total volume of the metering chamber is constant, the reducing agent which is located in the second chamber is forced out via the output of the second chamber while the first volume is filled via the opened input and as a result of the filling of the first volume the position-variable element is deflected accordingly so that the second volume is evacuated.

It is especially advantageous here that the invention allows the exact establishment of the metering volume by cycle and works independently of the manner of operation and the composition of the delivery pump. No additional mass flow measurement means are required in the metering section and the system operates without nonreturn valves.

Another advantage in the reducing agent metering system is that it works free of cavitation downstream of the pump. Here an electronic control of simple structure is enabled since exact metering is ensured by the metering chamber. Another advantage is that the high load of the pump is decoupled from the components with load which are to be controlled, such as especially from the injection nozzle.

In one preferred embodiment each of the two volumes at its input has a switchable inlet valve.

Preferably each of the two volumes has a switchable outlet valve at its output.

The inlet valves and/or the outlet valves can be switching valves which are actuated magnetically or piezoelectrically or by electric motor or pneumatically. This means that the valve can be triggered in any desired manner.

In this embodiment each of the two volumes which have been formed in the metering chamber has one input and one output which each have a switchable valve.

Preferably the inputs of the two volumes are connected to the delivery line of the pump and are fed from the delivery line. Here it is also possible for the delivery line to have a multiport valve, by means of which the inlet to the two volumes can be controlled.

Preferably the outputs of the two volumes discharge into a metering line to the nozzle. Here the metering line can have a multiport valve by means of which the outlet from the two volumes can be controlled.

Thus designs are possible in which there are individual switching valves at the inputs and outputs to the two volumes in the metering chamber. Alternatively there can also be multiport valves in the delivery line upstream of the metering chamber and in the metering line downstream of the metering chamber; the opening and closing of the inlets and outlets of the two volumes are possible by means of the multiport valves.

Preferably the delivery pump is pressure-limited and/or a pressure limiter is integrated into the delivery line between the delivery pump and the metering chamber.

In one preferred embodiment of the reducing agent metering system there is a compressed air supply, the reducing agent being atomized inside or outside of the nozzle by means of compressed air. To atomize the reducing agent there can be a mixing chamber within which the atomization of the reducing agent by means of compressed air takes place prior to introduction into the exhaust gas line. But in one preferred embodiment the nozzle is made as an externally mixing binary nozzle in which the reducing agent solution emerges from a first nozzle opening and compressed air emerges from a second nozzle opening, the two nozzle openings being aligned to one another such that the compressed air atomizes the reducing agent outside of the nozzle so that the nozzle is made as an externally mixing binary nozzle and aerosol formation occurs outside of the nozzle.

Preferably there is a compressed air supply which has a switching valve and/or a pressure control valve. This switching valve is used for control, i.e. turning the compressed air supply on and off.

Alternatively or cumulatively the compressed air supply can have a pressure control valve. In this way the compressed air can be set to a pressure level which is desired for atomization of the reducing agent by means of compressed air. The compressed air itself can be taken from an embarked compressed air system, for example of a truck, in whose exhaust gas line the metering system is located, without the system pressure which is prevailing in the compressed air system constituting a limitation, since the pressure of the compressed air can be reduced to the desired pressure.

In one preferred embodiment of the reducing agent metering system there is a compressed air supply, the delivery line and/or the metering chamber and/or the metering line being connected via a switching valve to the compressed air supply in order to clear them of reducing agent by means of compressed air after completion of metering.

In this way the delivery line and/or the metering chamber and/or the metering line can be cleared of the reducing agent solution by means of compressed air after completion of metering in order to prevent the reducing agent solution from freezing or crystallizing out. In this way freezing damage can be efficiently prevented.

The metering pump can be especially a membrane pump or a piston pump or a centrifugal pump or an orbital pump or a geared pump.

A membrane pump which is used as a metering pump can be triggered for example with a frequency of up to 50 Hz or up to 100 Hz. The triggering signal of the membrane pump can be pulse width modulated.

In the method for operating a reducing agent metering system for injection of a reducing agent into the exhaust gas flow of an internal combustion engine for selective catalytic reduction, in one especially advantageous development the delivery line and/or the metering chamber and/or the metering line after completion of metering is connected via a switching valve to a compressed air supply in order to clear them of reducing agent by means of compressed air, at least one cycle with compressed air being passed through or all inputs and outputs of the two volumes being opened at the same time.

One cycle means that the input of the first volume simultaneously together with the output of the second volume is opened while the input of the second volume and the output of the first volume are closed, and then the input of the second volume simultaneously with the output of the first volume is opened while the input of the first volume and the output of the second volume are closed.

By this sequence of at least one cycle with compressed air instead of the reducing agent solution or however with simultaneously opened inlet and outlet valves on the two volumes, the delivery line, the metering chamber and the metering line after completion of metering are reliably cleared of the reducing agent solution so that the reducing agent solution is prevented from freezing or crystallizing out and frost damage is efficiently prevented.

One exemplary embodiment of the invention is shown in the figure and is detailed below.

FIG. 1 shows a system diagram of a reducing agent metering system with a metering chamber which is integrated into the delivery line.

FIG. 1 shows a system diagram of a reducing agent metering system with the metering chamber which is integrated into the delivery line.

The reducing agent is delivered from the tank 1 by means of the delivery pump 2. The delivery pump 2 is an integral component of the reducing agent metering system. The reducing agent is delivered from the tank 1 via the delivery line 3. The metering chamber 4 which is divided within by a membrane 5 into two volumes 10, 20 is integrated into the delivery line 3. The first volume 10 has one inlet 11 and one outlet 12. The inlet 11 is controlled via the inlet valve 13. The outlet 12 is controlled via the outlet valve 14. The inlet 11 is fed from the delivery line 3.

The second volume 20 likewise has one inlet 21 with an inlet valve 23. Furthermore the second volume 20 has one outlet 22 with the outlet valve 24. The inlet 21 of the second volume 20 is likewise fed from the feed line 3.

The two outlets 12 of the first volume 10 and 22 of the second volume 20 discharge into the metering line 6 to the nozzle 7. The reducing agent is introduced into the exhaust gas line which is not shown via the nozzle 7 and atomized. The inlet valves 13, 23 and the outlet valves 14, 24 of the two volumes 10, 20 in the metering chamber 4 can be triggered and switched independently of one another.

The reducing agent is delivered via the feed line 3 by means of the delivery pump 2. The delivery pump 2 is pressure-limited. The feed line 3 is divided upstream of the inlet valves 13, 23 and routed to the two inlet channels 11, 21 of the volumes 10, 20 which are separated by the metering membrane 5. On the outlet side the channels 12, 22 are joined downstream of the valves 14, 24 and discharge in the metering line 6 which is routed as far as the nozzle 7.

The reducing agent metering system operates by alternate-side opening and closing of the inlet valves 13, 23 and the outlet valves 14, 24 so that the inlet valve of one volume and the outlet valve of the other volume are opened at the same time while the other valves remain closed.

How the reducing agent metering system works during metering operation is explained in the following. Here the delivery pump 2 is in continuous operation. The valve 23 at the inlet to the second volume 20 opens while at the same time the outlet valve 14 of the first volume 10 opens. The second volume 20 is flooded until the membrane 5 adjoins the left wall of the first volume 10 so that the first volume 10 is completely evacuated via the outlet valve 14. As soon as this has taken place, the inlet valve 23 to the second volume 20 and the outlet valve 14 of the first volume 10 are closed and the inlet valve 13 to the first volume 10 and the outlet valve 24 of the second volume 20 are opened. As a result of the further delivery of the delivery pump 2 then the first volume 10 is filled with the reducing agent via the opened inlet valve 13 and the flexible membrane 5 is pushed back into the position shown in FIG. 1 in which the second volume 20 is completely evacuated via the opened outlet valve 24 and the membrane 5 adjoins the right wall of the second volume 20, while the first volume 10 is completely filled. In doing so the reducing agent which is located in the second volume 20 is delivered via the outlet valve 24 to the metering line 6 and further to the nozzle 7.

The above described cycle is permanently repeated during metering operation, i.e. the inlet of one volume and the outlet of the other volume are always opened in alternation so that the other volume is accordingly evacuated via the filling of the first volume and the displacement of the flexible membrane 5 and the reducing agent which is located therein is delivered to the metering line 6.

To purge the metering system there is an air feed 8 with a switching valve 9 on the delivery line 3 between the delivery pump 2 and the metering chamber 4. Purging is necessary in order to clear the reducing agent from the metering system after completion of metering in order to prevent freezing of the reducing agent and/or to prevent the reducing agent from crystallizing out since this could damage the metering system and could clog the nozzle.

After completion of metering, with the delivery pump turned off the switching valve 9 is thus opened via the air feed 8 and compressed air is introduced into the delivery line 3. There are two possibilities for purging. On the one hand, the above described cycle can be passed through with alternate-side opened and closed inlet and outlet valves with compressed air in order to clear reducing agents from both the two volumes 10, 20 and also the metering line 6 and the nozzle 7.

Alternatively purging can also be undertaken by all inlet and outlet valves 13, 14, 23, 24 being opened at the same time for a certain time interval so that both the delivery line 3 together with the inlets 11, 21 and also the two volumes 10, 20 and their outlet channels 12, 22 as well as the metering line 6 and the nozzle 7 are completely filled with air, i.e. that the reducing agent which is located in the delivery line 3, the metering chamber 4, the metering line 6 and the nozzle 7 is pushed out into the exhaust gas line by means of the compressed air via the nozzle 7.

The metering chamber 4 which is divided within by the flexible membrane 5 into two volumes 10, 20 enables exact establishment of the metering volume without the operation and composition of the delivery pump 2 making a difference.

The invention claimed is:

1. A reducing agent metering system for injection of a reducing agent into the exhaust gas flow of an internal combustion engine for selective catalytic reduction comprising a delivery pump (2) by means of which the reducing agent is delivered from a reducing agent tank (1) via a delivery line (3) and is introduced into the exhaust gas flow of the internal combustion engine via at least one nozzle (7), wherein a metering chamber (4) is integrated into the delivery line (3) and is divided into two separate volumes (10, 20) by means of a position-variable element (5), each of the two volumes (10, 20) having at least one input (11, 21) and at least one output (12, 22) and wherein the inputs (11, 21) of the two volumes (10, 20) are connected to the delivery line (3) of the pump (2) and are fed from the delivery line (3).

2. The metering system as claimed in claim 1, wherein the position-variable element is a flexible membrane (5).

3. The metering system as claimed in claim 1, wherein each of the two volumes (10, 20) at its input (11, 21) has a switchable inlet valve (13, 23).

4. The metering system as claimed in claim 1, wherein each of the two volumes (10, 20) at its output (12, 22) has a switchable outlet (14, 24) valve.

5. The metering system as claimed in claim 3, wherein the inlet valves (13, 23) or the outlet valves (14, 24) are switching valves which are actuated magnetically or piezoelectrically or by electric motor or pneumatically.

6. The metering system as claimed in claim 1, wherein the delivery line (3) has a multiport valve by means of which the inlet to the two volumes (10, 20) can be controlled.

7. The metering system as claimed in claim 3, wherein the outputs (12, 22) of the two volumes (10, 20) discharge into a metering line (6) to the nozzle (7), wherein the metering line (6) has a multiport valve by means of which the outlet from the two volumes (10, 20) can be controlled.

8. The metering system as claimed in claim 3, wherein the delivery pump (2) is pressure-limited or wherein a pressure limiter is integrated into the delivery line (3) between the delivery pump (2) and the metering chamber (4).

9. The metering system as claimed in claim 3, wherein there is a compressed air supply and the reducing agent is atomized inside or outside of the nozzle (7) by means of compressed air, wherein the compressed air supply has a switching valve or pressure control valve.

10. The metering system as claimed in claim 3, wherein the delivery line (3) and/or the metering chamber (4) and/or the metering line (6) are connected to a compressed air supply (8) via a switching valve (9) in order to clear them of reducing agent by means of compressed air after completion of metering.

11. The metering system as claimed in claim 3, wherein the delivery pump (2) is a membrane pump or a piston pump or a centrifugal pump or an orbital pump or a geared pump.

12. A method for operating a reducing agent metering system for injection of a reducing agent into the exhaust gas flow of an internal combustion engine for selective catalytic reduction comprising a delivery pump (2) by means of which the reducing agent is delivered from a reducing agent tank (1) via a delivery line (3) and is introduced into the exhaust gas flow of the internal combustion engine via at least one nozzle (7), characterized in that a metering chamber (4) is integrated into the delivery line (3) and is divided into two separate volumes (10, 20) by means of a position-variable element (5), each of the two volumes (10, 20) having at least one input (11, 21) and at least one output (12, 22), during metering operation of the metering system cycles being repeatedly passed through in which in alternation the input (11) of the first volume (10) simultaneously with the output (22) of the second volume (20) is opened, while the input (21) of the second volume (20) and the output (12) of the first volume (10) are closed, and then the input (21) of the second volume (20) simultaneously with the output (12) of the first volume (10) is opened while the input (11) of the first volume (10) and the output (22) of the second volume (20) are closed.

13. The method as claimed claim 12, wherein the delivery line (3) and/or the metering chamber (4) or the metering line (6) is connected to a compressed air supply (8) via a switching valve (9) after completion of metering in order to clear them of reducing agent by means of compressed air, at least one cycle with compressed air being passed through or all inputs (11, 21) and outputs (12, 22) of the two volumes (10, 20) being opened at the same time.

14. The metering system as claimed in claim 2, wherein each of the two volumes (10, 20) at its output (12, 22) has a switchable outlet (14, 24) valve.

15. The metering system as claimed in claim 14, wherein the inlet valves (13, 23) and/or the outlet valves (14, 24) are switching valves which are actuated magnetically or piezo-electrically or by electric motor or pneumatically.

16. The metering system as claimed in claim 14, wherein the inputs (11, 21) of the two volumes (10, 20) are connected to the delivery line (3) of the pump (2) and are fed from the delivery line (3), wherein the delivery line (3) has a multiport valve by means of which the inlet to the two volumes (10, 20) can be controlled.

17. The metering system as claimed in claim 14, wherein the outputs (12, 22) of the two volumes (10, 20) discharge into a metering line (6) to the nozzle (7), wherein the metering line (6) has a multiport valve by means of which the outlet from the two volumes (10, 20) can be controlled.

18. The metering system as claimed in claim 14, wherein the delivery pump (2) is pressure-limited or wherein a pressure limiter is integrated into the delivery line (3) between the delivery pump (2) and the metering chamber (4).

19. The metering system as claimed in claim 14, wherein there is a compressed air supply and the reducing agent is atomized inside or outside of the nozzle (7) by means of compressed air, wherein the compressed air supply has a switching valve or pressure control valve.

20. The metering system as claimed in claim 14, wherein the delivery line (3) or the metering chamber (4) and/or the metering line (6) are connected to a compressed air supply (8) via a switching valve (9) in order to clear them of reducing agent by means of compressed air after completion of metering and wherein the delivery pump (2) is a membrane pump or a piston pump or a centrifugal pump or an orbital pump or a geared pump.

* * * * *